United States Patent [19]
Davis et al.

[11] Patent Number: 5,259,901
[45] Date of Patent: Nov. 9, 1993

[54] METHOD FOR CONSTRUCTING AN INFLATABLE MANDREL

[75] Inventors: Kevin Davis; James A. Yorgason, both of Ogden, Utah

[73] Assignee: Thiokol Corporation, Ogden, Utah

[21] Appl. No.: 889,445

[22] Filed: May 27, 1992

[51] Int. Cl.$^5$ .............................. B65H 81/00
[52] U.S. Cl. .................. 156/154; 156/156; 156/155; 156/173; 156/175; 156/293; 156/425
[58] Field of Search ............. 156/153, 154, 155, 156, 156/166, 169, 173, 175, 185, 189, 191, 87, 268, 293, 304.5, 307.7, 307.1, 425, 429, 430, 285, 286

[56] References Cited

U.S. PATENT DOCUMENTS

| | | | |
|---|---|---|---|
| 3,210,228 | 10/1965 | Bluck | 156/173 X |
| 3,414,449 | 12/1968 | Beach | 156/173 |
| 4,684,423 | 8/1987 | Brooks . | |
| 4,921,557 | 5/1990 | Nakamura | 156/191 X |

OTHER PUBLICATIONS

Special report prepared by Manufacturing Research and Development, pp. I-IV; 1-9; and 11 (publication date unknown).

*Primary Examiner*—Jeff H. Aftergut
*Attorney, Agent, or Firm*—Madson & Metcalf

[57] ABSTRACT

A method for constructing an inflatable elastomer mandrel for use in fabricating composite articles is provided. The method comprises the steps of preparing a rigid, water soluble mandrel to the desired size and shape with a shaft extending therethrough; applying a mold releasing ply to the water soluble mandrel; applying a first layer of uncured elastomer to cover the water soluble mandrel; curing the first layer of elastomer to form a base layer for a work piece mandrel wherein the work piece mandrel initially comprises the cured layer of elastomer disposed about the water soluble mandrel; applying a second layer of uncured elastomer to cover the work piece mandrel; winding a fiber onto the work piece mandrel; applying a third layer of uncured elastomer to cover the winding of the fiber of the work piece mandrel; winding a second fiber onto the third layer of elastomer of the work piece mandrel; applying a fourth layer of uncured elastomer to cover the winding of the second fiber of the work piece mandrel; curing the layers of elastomer having been applied to the work piece mandrel; and dissolving the water soluble mandrel and removing the shaft from the work piece mandrel. The work piece mandrel may then be connected to tooling, inflated, and its surface machined to the desired contour and texture. A mandrel having a two-piece mandrel/sleeve configuration may be constructed wherein only the sleeve has hoop windings so that the mandrel is more readily collapsible.

24 Claims, 6 Drawing Sheets

METHOD FOR CONSTRUCTING AN INFLATABLE MANDREL

FIELD OF THE INVENTION

The present invention relates to a process for fabricating a reusable, inflatable/collapsible mandrel used in the manufacturing of composite articles by methods such as filament winding, braiding, tape rolling, hand lay-up, and resin transfer molding processes.

BACKGROUND OF THE INVENTION

Methods for constructing filament wound vessels, tanks and containers are well known in the prior art. When composite pressure vessels, such as rocket motor cases or pressurized tanks, are fabricated on a mandrel so that there are end openings in the vessel which are smaller than the overall diameter of the vessel, there is the problem of removing the mandrel from the vessel. Typically, it is not advisable to cut the vessel from the mandrel and then join and bond the vessel pieces together to form the desired pressure vessel. This is because the joint in the vessel creates an inherent weakness which may fail or fracture when the vessel is subjected to pressure or stress. It is more desirable to remove the mandrel through the small openings in the vessel.

Heretofore, the problem of removing the mandrel from the composite vessel usually has led to one of three solutions. The first is to use a sacrificial mandrel which is destroyed upon removal. Such one-use mandrels can be expensive and vessel fabrication is time consuming when the number of units to be fabricated is considerable. Another solution is to use a collapsible mandrel that is disassembled and removed from the vessel, later to be reassembled and used again. Such mandrels are known as segmented mandrels. Use of segmented mandrels require time consuming assembly and disassembly. Additionally, the fabrication costs for a segmented mandrel that can consistently meet specified dimensional tolerances upon repeated disassembly and reassembly are, in many cases, prohibitively expensive. Still another solution is to use an inflatable mandrel which has the ability to eliminate the repetitive mandrel fabrication costs in the case of sacrificial mandrels, and the assembly/disassembly costs in the case of conventional segmented mandrels.

Inflatable mandrel development for composites started in the United States approximately twenty years ago. Initially, slosh coating an elastomeric material was used, followed by stitching of rubberized gore patterns to fit the desired shape.

One current method for fabricating an inflatable mandrel was developed, using uncured silicone rubber sheet stock, cut and formed to the desired mold shape. Initially, a wooden male pattern is made to match the external configuration of the inflatable mandrel to be fabricated. Next, two mating female plaster patterns are made. A male plastic laminating mold is cast in the female plaster molds, coated with a hardener, and cured. The plastic laminating mold is release coated with a mold release and sheets of uncured silicone rubber sheet stock are cut and fitted into each half of the mold. Additional layers of silicone rubber sheet stock reinforced with fabric, are fitted into the plastic laminated mold for tear resistance. An end plate is prefit into the uncured silicone rubber mandrel being fabricated. The two halves of the plastic laminated mold are separated, and a layer of silicone adhesive rubber is applied. The plastic laminated mold halves are carefully aligned and bolted together. The closed plastic laminated mold is pressurized to check for leaks. An external envelope vacuum bag is installed over the plastic laminated mold and checked for leaks before placing it in an autoclave. When placed in the autoclave, the uncured silicone rubber inflatable mandrel is purged of air and cured under pressure at temperatures of about 350° F. A coat of mold release is applied to the inflatable mandrel after it is removed from the plastic laminated mold. The mandrel is then post cured at 400° for 4 hours.

Another known method for fabricating an inflatable mandrel is disclosed in U.S. Pat. No. 4,684,423. Under this method a rigid mandrel is prepared and supported on a rotatable axle. One or more layers of strips of rubber are applied longitudinally on the mandrel to form an enclosure. Coats of rubber solution are applied over the layers, and a layer of fibers is wound over at least one of the layers. The rubber layers are then cured. The layers are cut into two parts, removed from the rigid mandrel, and rejoined by using reinforcing straps along the seam of the joined parts. This collapsible mandrel may be used to fabricate either filament wound tanks or other collapsible mandrels, neither of which would have a seal or joint.

However, no known inflatable mandrel is suitable for fabrication of a pressure vessel and is removable through a small opening (e.g., an opening of about 40% of the diameter of the vessel) in the vessel. Consequently, it would be an advance in the art of inflatable mandrel fabrication to provide a method for fabricating a collapsible inflatable mandrel that is streamlined to reduce fabrication costs and time and is capable of creating a seamless vessel.

OBJECTS AND BRIEF SUMMARY OF THE INVENTION

In view of the foregoing needs and problems experienced in inflatable mandrel fabrication, it is a primary object of the present invention to provide a new method for fabricating an improved type of mandrel structure to be used in the manufacturing of composite parts by methods such as filament winding, braiding, tape rolling, automated and hand lay-up, and resin transfer molding.

It is another object of the present invention to provide a method for fabricating a reusable, inflatable/collapsible mandrel which can be quickly and easily removed from composite parts which have at least one opening that may be considerably smaller than the overall width or diameter of the main body of the part.

A further object of the present invention is to provide a method for fabricating a seamless inflatable mandrel which will maintain a desired thickness and shape when subjected to varying internal pressures.

Another object of the present invention is to provide a method for fabricating an inflatable mandrel that can be machined to a desired contour.

Still another object of the present invention is t provide a method for fabricating an inflatable mandrel that has a relatively smooth outer surface and is free of bubbles and leaks.

The foregoing objects are realized by application of the methods and the embodiments of mandrel structure of this invention. The methods of the present invention are designed to fabricate a hollow, reinforced, inflatable, elastomer mandrel with at least one opening or port through which a gas may be supplied or removed to respectively inflate or deflate the inflatable mandrel. The inflatable mandrel constructed comprises layers of an elastomer containing interspersed layers of fiber reinforcement. The inflatable mandrel may be inflated to its expanded condition by connection of a pressurized gas supply. The actual steps for preparation of the surface of the inflatable mandrel is dependent upon specific materials and manufacturing processes selected for the composite fabrication. Following the inflatable mandrel surface preparation, the composite shell can be completed by the desired manufacturing process such as filament winding, braiding, tape rolling, hand lay-up, and resin transfer molding. This composite shell is then consolidated, cured, or set in a rigid state dependent upon subsequent process operations. The pressure is then released allowing the inflatable mandrel to deflate and collapse, facilitating removal of the mandrel from the interior of the composite shell. Upon removal from the composite shell, the inflatable mandrel may be immediately readied for another composite fabrication process.

The inflatable mandrel is constructed about a solid mandrel which has been formed to the desired size and shape. The solid mandrel may be constructed by any conventional method which would allow the solid mandrel to be removed from inside the inflatable mandrel yet to be constructed. A water soluble binder/sand mandrel (hereinafter referred to as a "sand mandrel") offers many advantages to the fabrication process for an inflatable mandrel. Although other types of removable mandrels may be used such as plaster mandrels and the like, for the simplicity of description, reference in this application will be made to the use of a sand mandrel.

The sand mandrel is fabricated incorporating a rigid shaft extending lengthwise through the center of the sand mandrel. Again, for ease of description, the sand mandrel described herein will be a cylindrical mandrel with domed ends. However, the sand mandrel can be formed into other desired shapes without departing from the spirit and intent o the invention. The sand mandrel is Teflon taped or release coated in some manner before the inflatable mandrel is constructed.

An uncured layer of the desired elastomer is placed on the mandrel covering the complete surface. Joints of the pieces used are skived and trimmed to eliminate the chance of leaks and to provide a smooth uniform layer of elastomer.

This first layer is then bagged in an appropriate manner and autoclave cured. This cured layer provides a firm base and defines the initial layer for a work piece mandrel (i.e., the inflatable mandrel during fabrication before completion) which will receive subsequent reinforcement and elastomer layers to form an inflatable mandrel. A second layer of uncured elastomer is placed on the surface of the work piece mandrel in the same manner as previously stated, taking care to avoid trapping air between the layers of elastomer.

The work piece mandrel is now filament wound with a fiber reinforcement previously treated with an adhesive primer. The type of primer used is selected to complement the type of elastomer used to form the layers. In one preferred embodiment, a layer of circumferential hoop windings are wound over the cylinder section of the work piece mandrel at a specified spacing or wind density. This hoop wind is then covered with another layer of elastomer applied as before. A layer of helical windings are then wound over the entire surface of the work piece mandrel at a specified wind angle and spacing or wind density. The number, of alternate elastomer and reinforcement layers, is determined by the size and structural requirements for the inflatable mandrel. Regardless of the number of elastomer and reinforcement layers, it is preferred that the sequence always end with an elastomer layer to be the exterior of the inflatable mandrel.

The work piece mandrel is again appropriately bagged and autoclave cured as before. After the work piece mandrel is cured, the water soluble sand mandrel is dissolved and washed out from the inside of the reinforced elastomer, inflatable mandrel.

The inflatable mandrel is now ready to be assembled to the process tooling, pressurized, and inspected for use. The inflatable mandrel can be used as is, or may be machined to a specified dimension.

An inflatable mandrel constructed by this prescribed method results in a reusable, seamless, inflatable/collapsible mandrel capable of being used with any or all of the conventional composite manufacturing processes. It is also a mandrel that can quickly and easily be removed from the composite article that was fabricated around it.

Another preferred method for constructing an inflatable mandrel is to construct a two-piece mandrel assembly. First, an inflatable work piece mandrel is constructed in the manner described above except that no hoop windings of fiber are used. Reinforcement of the layers of elastomer is accomplished with helical or polar windings of fiber only. This creates an inflatable work piece mandrel that may be collapsed more easily than a mandrel with hoop windings. The inflatable work piece mandrel is then machined to have a circumferential groove.

Next, a cylindrical sleeve of elastomer and reinforcement fiber is constructed by any known method. Hoop windings of fiber are used in the cylindrical sleeve. The cylindrical sleeve is constructed to fit into the circumferential groove machined into the surface of the inflatable mandrel. With the sleeve disposed over the mandrel, the mandrel may be inflated to the desired pressure. The hoop windings within the cylindrical sleeve act as if disposed within the inflatable mandrel, giving the mandrel lateral reinforcement and structural integrity.

After the composite article is fabricated over the two-piece mandrel assembly (i.e., the inflatable mandrel and sleeve), the inflatable mandrel may be deflated so that it collapses away from the sleeve. The collapsed mandrel may then be removed through a small opening in the composite article. Once the collapsed inflatable mandrel is removed, the sleeve may be retrieved through the opening.

The two-piece inflatable mandrel assembly is reusable, seamless, inflatable/collapsible, and is capable of being used with any or all of the conventional composite manufacturing processes. It is also a mandrel that can quickly and easily be removed from the composite article that was fabricated around it.

These and other objects and features of the present invention will become more fully apparent through the following description and appended claims taken in conjunction with the accompanying drawings.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity an detail through the use of the accompanying drawings in which.

DETAILED DESCRIPTION OF THE PREFERRED EMBODIMENTS

Referring now specifically to the drawings, wherein like numerals indicate like parts throughout, the following discussion comprises the sequence of specific process operations used in the fabrication of an inflatable and collapsible mandrel structure developed for the manufacture of composite parts. Specific materials and physical dimensions are not stated nor implied, as these process steps can be applied to any number of materials, and may be used with a mandrel of indeterminate size and shape.

Figure 1:
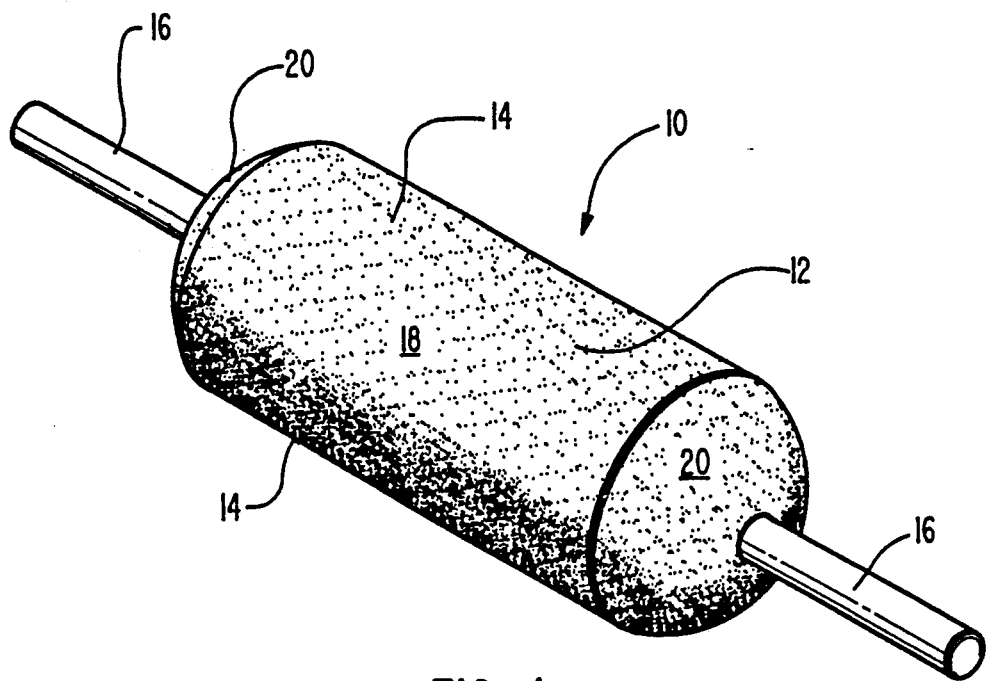
FIG. 1 is a perspective view of a water soluble sand mandrel having a cylindrical configuration with domed ends and a shaft disposed therethrough.

Referring first to FIG. 1, an inflatable mandrel is constructed about a solid mandrel, generally designated 10, which has been formed to the desired size and shape. The solid mandrel 10 may be constructed by any conventional method which would allow the solid mandrel 10 to be removed from inside the inflatable mandrel yet to be constructed. The solid mandrel 10 shown in FIG. 1 is preferably a water soluble sand mandrel 12 having a formed surface 14 which is held to form by a water soluble bonding agent (not specifically shown) such as a solution containing polyvinyl alcohol (PVA) or sodium silicate. A water soluble sand mandrel 12 is preferred because it offers many advantages to the fabrication process for an inflatable mandrel. Although other types of removable mandrels may be used such as plaster mandrels, segmented mandrels and the like, reference in this application will be made to the use of a sand mandrel 12.

The sand mandrel 12 is fabricated incorporating a rigid shaft 16 extending lengthwise through the center of the san mandrel 12. The rigid shaft 16 is disposed for connection to a conventional filament winding machine (not shown) so that the sand mandrel 12 may be rotated and manipulated as desired.

The sand mandrel 12 shown in FIG. 1 is a solid mandrel 10 with a cylindrical body 18 and domed ends 20. However, it should be understood that the sand mandrel 12 can be formed into other desired shapes without departing from the spirit of the invention.

Figure 2:
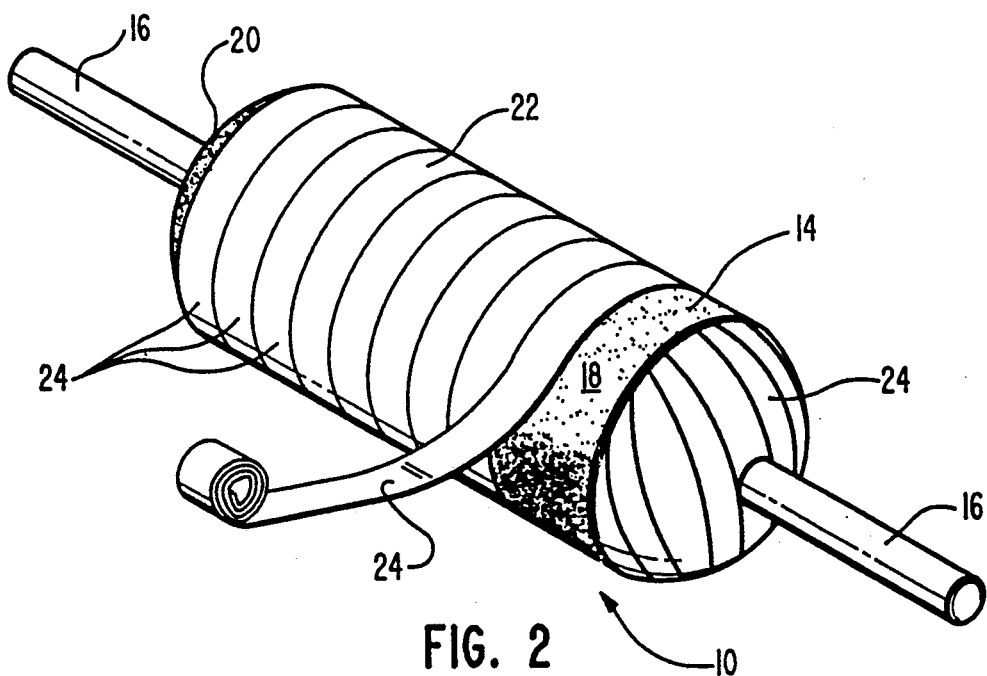
FIG. 2 is a perspective view of a sand mandrel showing the application of a teflon tape release ply in process.

To assure that the inflatable mandrel to be constructed on the sand mandrel 12 may be freely extracted from the sand mandrel 12, a release ply 22 may be applied to the sand mandrel 12. This release ply 22 may be applied in any of a number of conventional manners; for example, the release ply 22 may be sprayed on, or applied with a brush, or applied as a tape. One preferred release ply is a Teflon, polytetrafluoroethylene, tape 24 as shown in FIG. 2 which is applied to the sand mandrel 12 before the inflatable mandrel is constructed.

An uncured layer of elastomer 26 is placed on the solid mandrel 10 covering the release ply 22 which is disposed over the formed surface 14. Any of a number of elastomers can be used depending on the characteristics desired for the inflatable mandrel. It has been found that a silicone elastomer is particularly suitable for constructing an inflatable mandrel by the methods disclosed herein. However, the inflatable mandrel could also be made of other elastomers such as natural rubber (cis-polyisoprene), isoprene, nitrile, neoprene, urethane, butadiene, or the like or a combination of elastomers. Typically, the elastomer 26 is applied as sheets which are disposed in adjacent overlapping abutment. Joints between the abutting sheets of elastomer 26 are skived (see the skived edge 25 shown in FIG. 4a) and trimmed (see the trimmed portion 27 shown in FIG. 4b) to eliminate the chance of leaks and to provide a smooth uniform layer of elastomer 26 which will cure into a seamless layer of elastomer 26.

Figure 5:
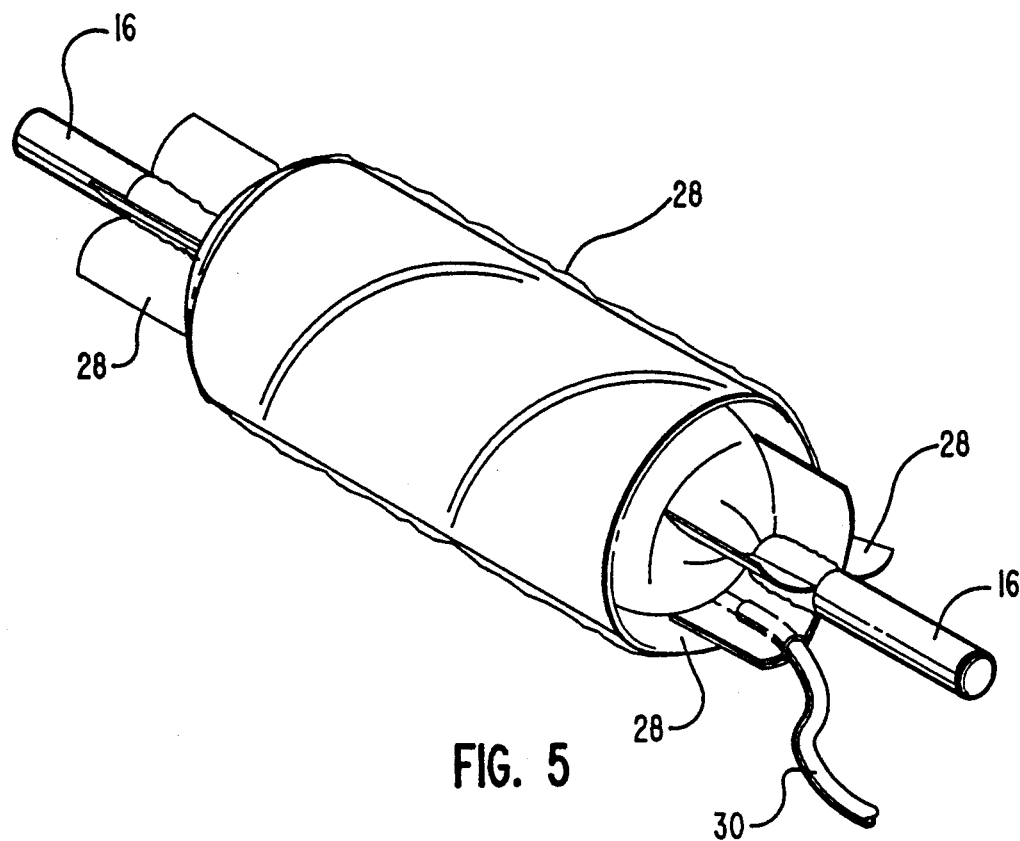
FIG. 5 is a perspective view of the sand mandrel with its layer of elastomer as bagged in a vacuum bag for curing.

This first layer of elastomer 26 is then bagged in a conventional manner and autoclave cured. Typically, the preparation of the first layer of elastomer 26 for curing involves applying a release ply (not shown) to the first layer of elastomer 26, applying a breather layer (not shown) to the release ply, and placing a vacuum bag 28 (FIG. 5) about the first layer of elastomer 26 as covered by the release ply and the breather layer. The release ply serves to assure that the vacuum bag 28 and breather layer can be removed from the cured first layer of elastomer 26 without damaging the outer surface of the elastomer 26. The breather layer communicates with a vacuum tube 30 which together enables a vacuum to be drawn which removes air and any volatiles from within the vacuum bag 28. Once the vacuum is drawn, the bagged mandrel may be placed in an autoclave and heated to a predetermined temperature for a predetermined period of time and subjected to a predetermined external pressure.

For curing an initial layer of an elastomer 26 of silicone, it has been found that heating the bagged mandrel at about 350° F. for about 2 hours has resulted in an appropriately cured elastomer 26. The curing parameters for other elastomers may differ, but are generally known by persons skilled in the art.

The cured layer of elastomer 26 provides a firm base and defines the initial layer for a work piece mandrel (i.e., the inflatable mandrel during fabrication before completion), generally designated 32, during each of the processing steps. The work piece mandrel 32 receives subsequent reinforcement and elastomer layers to form the inflatable mandrel. Although it is preferred to cure the initial layer of elastomer 26 before adding further layers of elastomer 26 (particularly when the initial layer of elastomer is silicone), it may not be necessary to cure the initial layer of elastomer 26 if the elastomer has sufficient surface strength to withstand a winding of fibers on its uncured surface.

Figure 3:
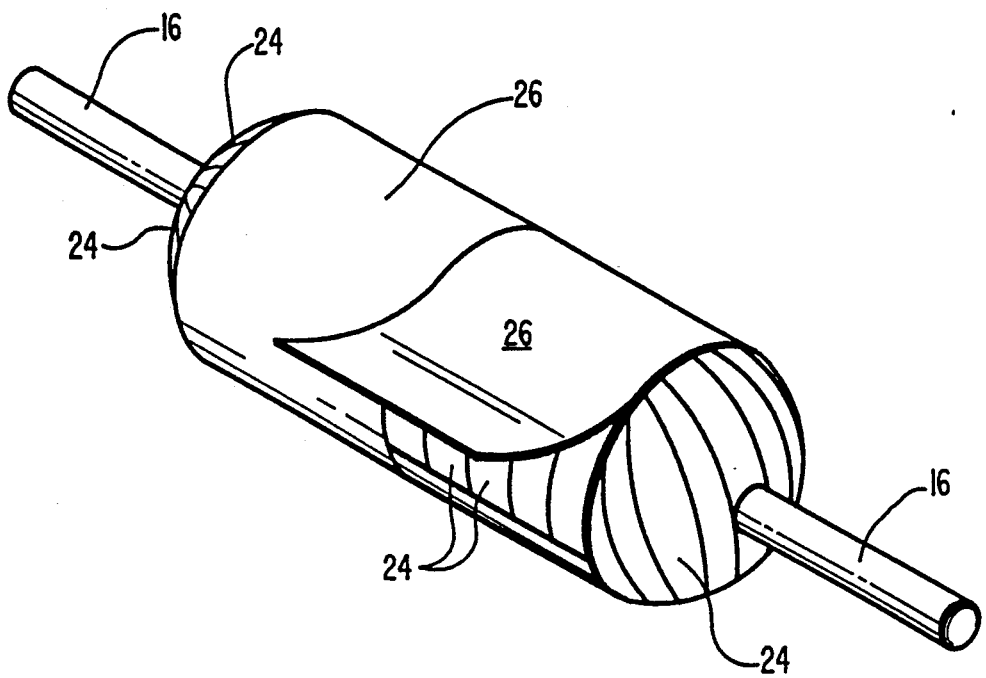
FIG. 3 is a perspective view of a release ply coated sand mandrel showing the application of a layer of elastomer.
Figure 4A:
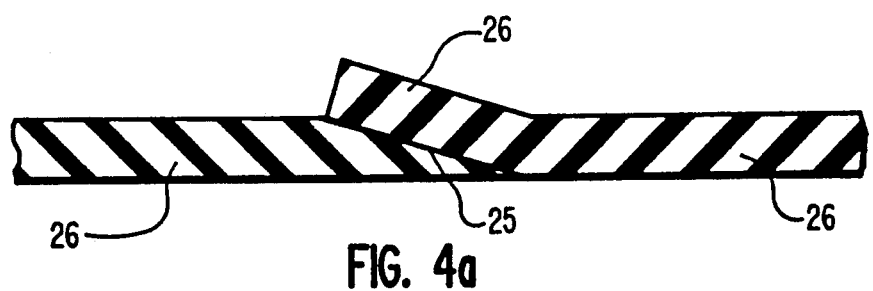
FIG. 4a is a sectional view of a layer of elastomer at a seam showing one edge as skived and the abutting edge as overlapped.
Figure 4B:
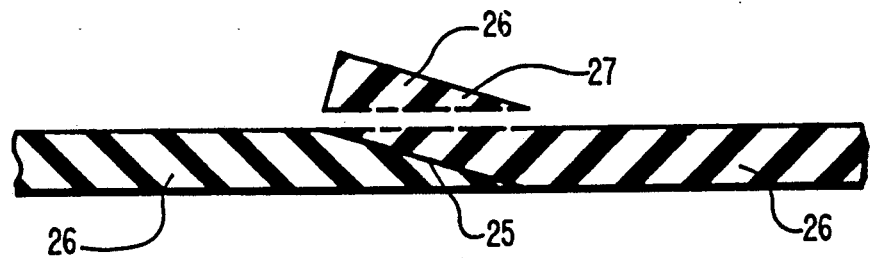
FIG. 4b is a sectional view of the same layer of elastomer as shown in FIG. 4a showing a portion of the overlapped edge being trimmed to form a smooth overlapping seam.

A second uncured layer of elastomer is placed on the surface of the work piece mandrel 32 in the same manner as shown in FIG. 3, taking care to avoid trapping air between the layers of elastomer 26. To eliminate the chance of leaks and to provide a smooth uniform layer of elastomer 26, the joints between the abutting sheets of elastomer 26 are again skived and trimmed as shown in FIGS. 4a and 4b.

Figure 6:
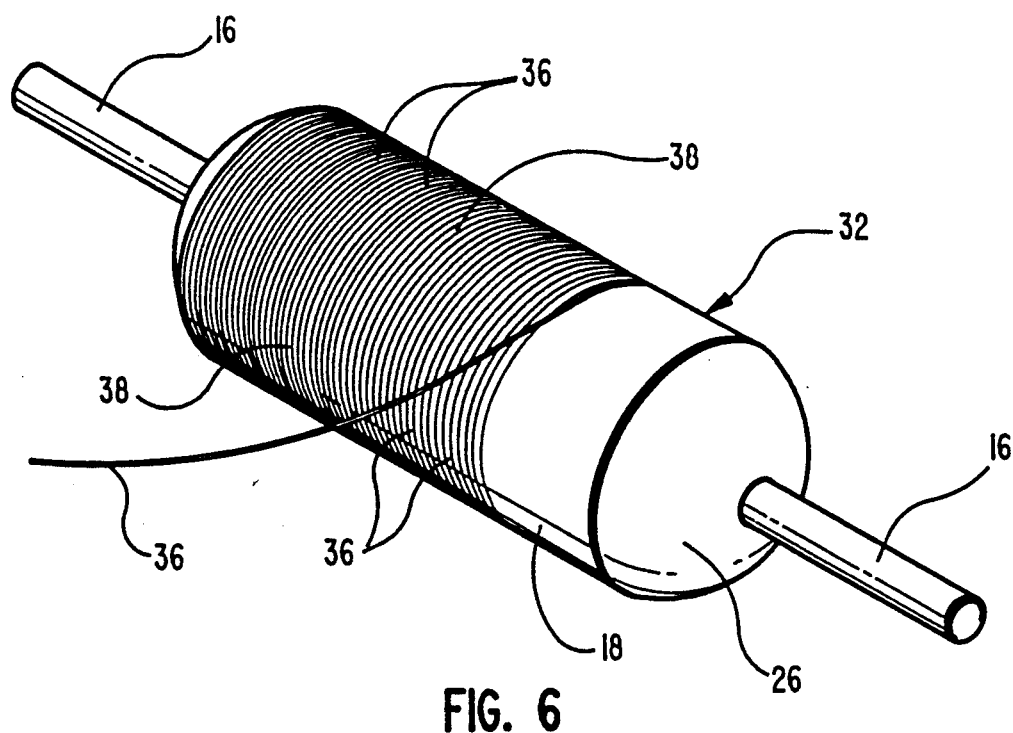
FIG. 6 is a perspective view of the work piece mandrel showing the application of a hoop winding of fiber about the cylindrical portion of the work piece mandrel.

The work piece mandrel 32 with the second layer of elastomer disposed thereon is then filament wound with a fiber 36 reinforcement as illustrated in FIG. 6. To accomplish such filament winding, the rigid shaft 16 is connected to a winding machine so that the work piece mandrel 32 can be rotated as desired. To assure proper bonding, the fiber 36 is treated with an adhesive primer before winding. The type of fiber 36 used may be any of a number of fibers used to reinforce elastomers such as Kevlar, glass, nylon, dacron, rayon, graphite, or boron and the like. The primer selected should complement the type of elastomer used to form the layers. In an embodiment using silicone, it has been found that winding with a Kevlar fiber is particularly suitable because Kevlar is strong, damage tolerant, and does not stretch as much as most other fibers.

The filament winding that may be used to reinforce the layers of elastomer 26 may be any of a number of conventional windings such as hoop windings, polar windings, or helical windings. In a preferred method of the present invention, a layer of circumferential hoop windings 38 are wound over the cylindrical body 18 of the work piece mandrel 32 at a specified spacing or wind density. The spacing for the winding is determined by the pressure requirements for the mandrel to be constructed. It has been found that a spacing of about one-sixteenth of an inch between strands of fiber 36 is particularly suitable for a silicone mandrel with pressure requirements between 0 and about 200 psi. Spacing the winding is desirable because it allows for elastomer to elastomer bonding of adjacent layers of elastomer 26.

This layer of hoop winding 38 is then covered with another layer of elastomer 26 applied as before. Again, care is taken to avoid trapping air between the layers of elastomer 26, and the joints between the abutting sheets of elastomer 26 are skived and trimmed.

Figure 7:
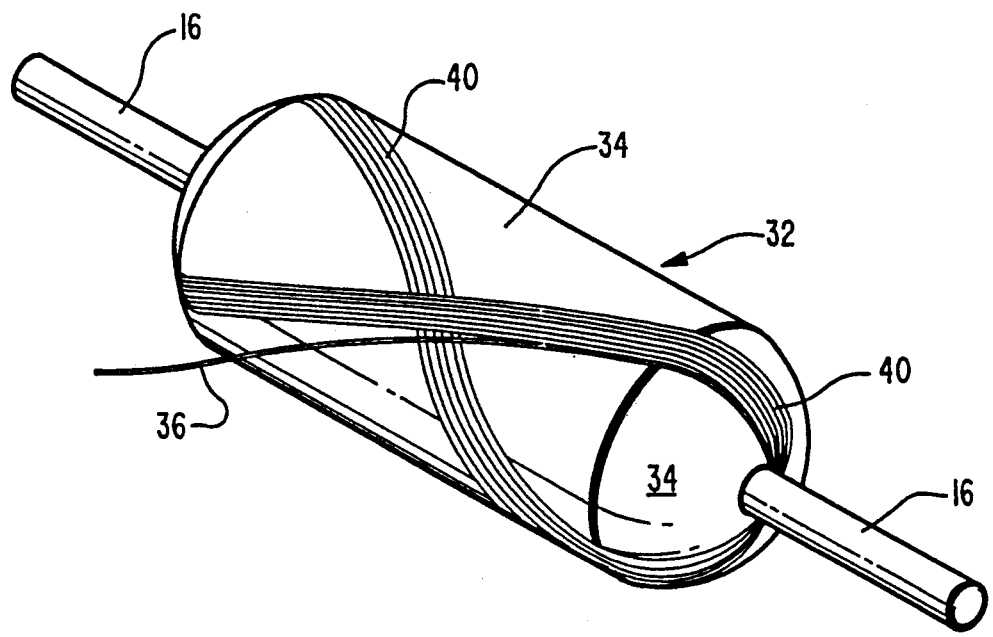
FIG. 7 is a perspective view of the work piece mandrel showing the application of a helical winding of fiber about the entire surface of the work piece mandrel.

Once the layer of elastomer 26 is in place, a layer of helical windings 40 are wound over the entire surface of the work piece mandrel 32 at a specified wind angle and spacing or wind density, as shown in FIG. 7. With helical windings 40 it has been found that the length of the mandrel and the size of the boss used, if any, determines the preferred wind angle. However, as with the hoop windings 38 described above, it is preferred that there be a spacing between the helical windings 40 so that there can be elastomer to elastomer bonding of adjacent layers of elastomer 26.

Figure 8:
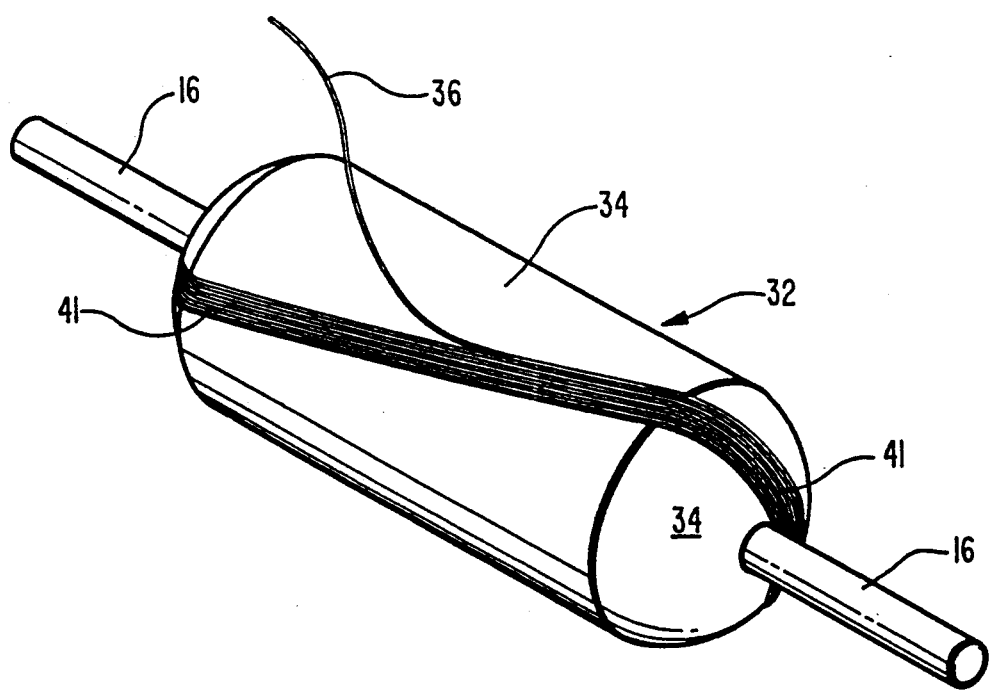
FIG. 8 is a perspective view of the work piece mandrel showing the application of a polar winding of fiber about the entire surface of the work piece mandrel.

Any number of alternate elastomer 26 and reinforcement fiber 36 layers may be applied to the work piece mandrel 32. Further, the layers of windings may be of different types such as hoop, helical, polar (see FIG. 8), or the like and can be applied in any desired order; for example, first a helical winding 40 and then a hoop winding 38 or all helical windings 40 or all polar windings 41 or all hoop windings 38 or any combination of windings. Since any number of alternate elastomer 26 and fiber 36 layers may be applied, the number of layers and the type of windings used are determined by the size and pressure requirements for the inflatable mandrel. Nevertheless, it is preferred that the sequence of alternating elastomer 26 and reinforcement fiber 36 layers always end with an elastomer 26 layer so that the exterior of the inflatable mandrel will remain smooth and can be machined to a precise contour without compromising the structural integrity of the windings.

One preferred method uses a minimum of elastomer 26 layers and a single winding of fiber 36. With this preferred method, a second layer of uncured elastomer 26 is applied to substantially cover the work piece mandrel 32, a single layer of fiber 36 is wound onto the second layer of elastomer 26, a third layer of uncured elastomer 26 is applied to cover the winding before the work piece mandrel 32 is cured. The sand mandrel 12 is then dissolved and washed out from the work piece mandrel 32, thereby leaving an inflatable, reinforced elastomer mandrel for use in constructing composite shells.

Of course, it should be understood that if the elastomer 26 selected has sufficient surface strength that it can withstand a winding without curing, then the simplest mandrel could comprise a first layer of uncured elastomer 26, a single winding of fiber 36, and a second layer of uncured elastomer 26. With this embodiment, the entire mandrel is cured after the second layer of elastomer 26 is applied.

With multi-layer mandrels having an initially cured base layer of elastomer 26, once the desired number of layers of elastomer 26 and fiber 36 are applied, the work piece mandrel 32 is again appropriately bagged and autoclave cured as before. Of course, it should be understood that intermediate steps of curing may be used as the various layers are applied. However, it is preferred that only an initial curing and a final curing be used because of the saving on man hours and energy.

After the work piece mandrel 32 is cured, a water line 42 is connected to the work piece mandrel 32 so that water can engage the water soluble sand mandrel 12.

Figure 9:
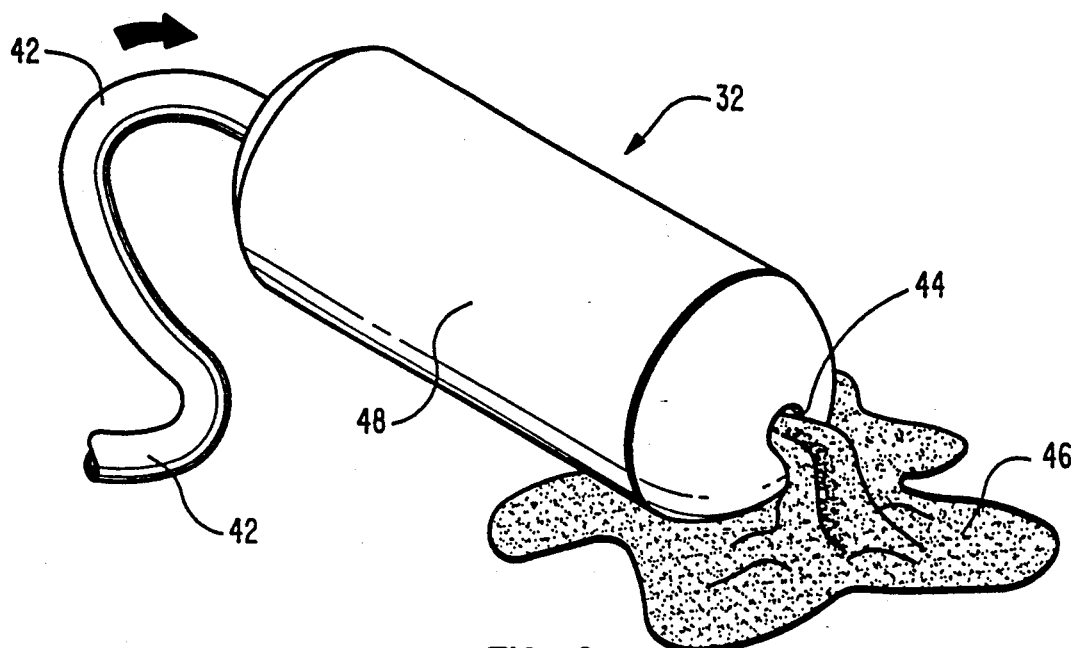
FIG. 9 is a perspective view of the work piece mandrel showing the application of water to dissolve and wash the sand of the sand mandrel out of the work piece mandrel.

Upon the introduction of water to the sand mandrel 12 (see the arrow in FIG. 9 for the direction of water flow), the sand mandrel 12 dissolves. The shaft 16 may be removed from the work piece mandrel 32 and the sand 46 is washed out from the inside of the reinforced elastomer inflatable mandrel as illustrated in FIG. 9.

With the sand mandrel 12 removed, the inflatable mandrel 48 is ready to be prepared for connection to the process tooling and pressurized and inspected for use. Typically, a bulkhead (not shown) is inserted and sealed into each of the openings 44 left when the shaft 1 is removed. The inflatable mandrel 48 may be inflated to a expanded condition by connection of a pressurized gas supply (not shown) to one of the bulkheads. The inflatable mandrel 48 can be used as is, or it may be machined to a specified dimension or contour. The inflatable mandrel 48 constructed as described above has no seams and may be used to construct seamless composite shells.

Following the preparation of the inflatable mandrel 48, the composite shell (not shown) can be completed by the desired manufacturing process such as filament winding, braiding, tape rolling, hand lay-up, and resin transfer molding. This composite shell may then be consolidated, cured, or set in a rigid state dependent upon subsequent process operations. By releasing the pressure, the inflatable mandrel 48 deflates and collapses to facilitate removal of the inflatable mandrel 48 from the interior of the composite shell. Upon removal of the inflatable mandrel 48 from the composite shell, the inflatable mandrel 48 may be immediately readied for another composite fabrication process.

An inflatable mandrel 48 constructed by this prescribed method results in a reusable, seamless, inflatable/collapsible mandrel capable of being used with any or all of the conventional composite manufacturing processes. It is also a mandrel that can quickly and easily be removed from the composite article that was fabricated around it.

Where construction of a composite pressure vessel with only one or more small openings is desired, a two-piece mandrel assembly may prove particularly suitable. The two-piece mandrel assembly of the present invention (see FIGS. 10 through 13) is capable of removal through a small opening that is only about 40% of the diameter of the composite vessel. The two-piece mandrel assembly, generally designated 50, comprises a machined inflatable mandrel 52 and a cylindrical sleeve 54.

In a preferred embodiment of the two-piece mandrel assembly 50, the machined inflatable mandrel 52 is constructed using only helical (FIG. 7) and/or polar (FIG. 8) windings 40, 41 of fiber 36 reinforcement. This enables the machined inflatable mandrel 52 to collapse smaller than it would otherwise collapse if hoop windings 38 were used.

Figure 10:
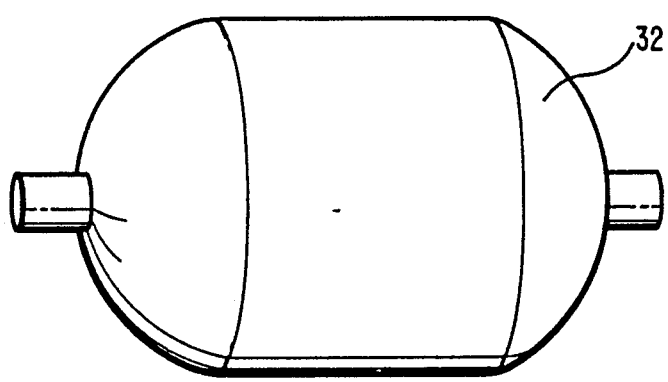
FIG. 10 is a top plan view of a work piece mandrel prior to machining of the surface thereof.
Figure 11:
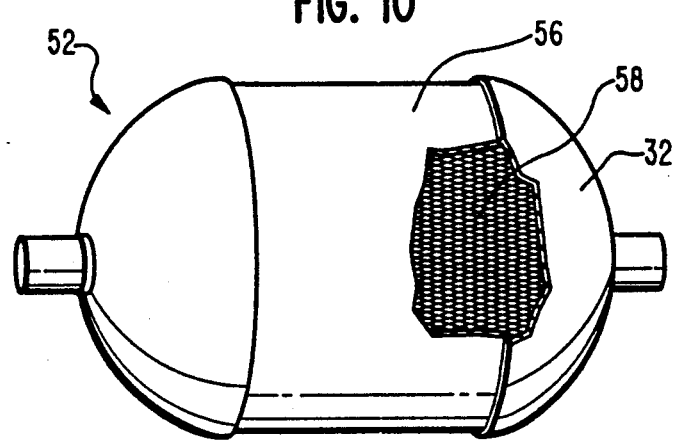
FIG. 11 is a top plan view of a work piece mandrel after the surface thereof has been machined to define a circumferential groove and showing a portion thereof cut away to illustrate a layer of helical wound reinforcement fiber.
Figure 12:
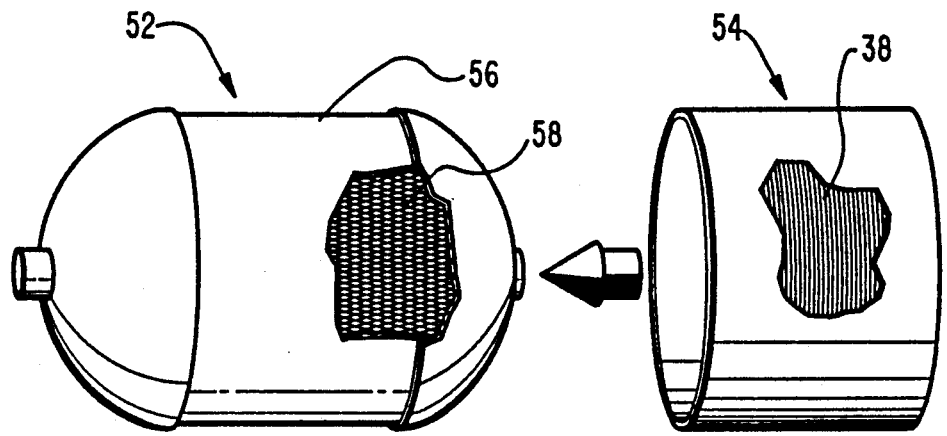
FIG. 12 is a exploded view of a machined inflatable mandrel and a cylindrical sleeve wherein the inflatable mandrel has a circumferential groove for receiving the sleeve and showing a cut away of the sleeve illustrating a layer of hoop wound reinforcement fiber.

To construct a two-piece mandrel assembly 50, a work piece mandrel 32 is prepared using one of the methods of the present invention described above and only helical and/or polar windings 40, 41 (collectively designated as 58) of fiber 36 reinforcement. A fully cured work piece mandrel 32, as shown in FIG. 10, is machined to have a circumferential groove 56 (see FIGS. 11 and 12).

Figure 13:
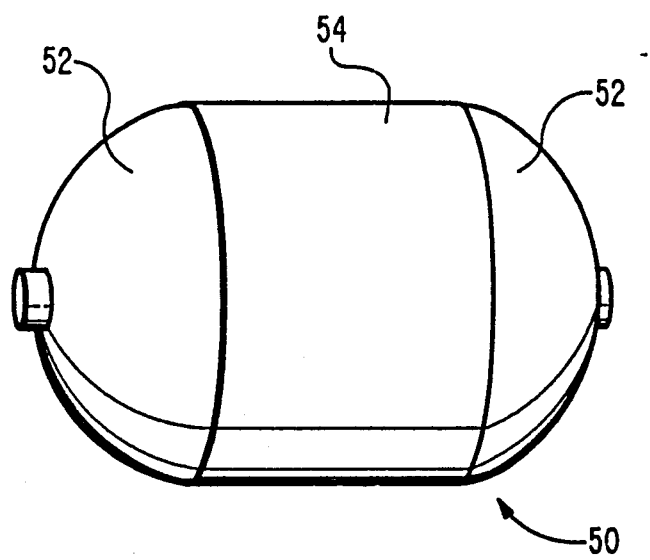
FIG. 13 is a top plan view of a two-piece mandrel assembly comprising the machined inflatable mandrel with the cylindrical sleeve disposed about the machined inflatable mandrel and within the circumferential groove.

The cylindrical sleeve 54 is constructed using fiber 36 reinforcement in hoop windings 38. The cylindrical sleeve 54 may be constructed using methods disclosed herein or any known method for making a cylindrical elastomer sleeve. The dimensions of the cylindrical sleeve 54 are constructed to correspond in fitting engagement with the groove 56 of the machined inflatable mandrel 52, as shown in FIG. 13. This assures that the cylindrical sleeve 54 will be positively located about the machined inflatable mandrel 52 when disposed within the circumferential groove 56.

Once the cylindrical sleeve 54 is disposed about the machined inflatable mandrel 52 in fitted engagement with the groove 56 (see FIGS. 12 and 13), the machined inflatable mandrel 52 may be inflated to the desired size and pressure. The two-piece mandrel assembly 50 may then be placed on a conventional composite winding machine and used to fabricate a composite pressure vessel. When the fabrication of the composite pressure vessel is complete, the machined inflatable mandrel 52 may be deflated and collapsed to facilitate its removal through a small opening in the composite pressure vessel. Once the machined inflatable mandrel 52 is removed, the cylindrical sleeve 54 may be retrieved through the small opening, or if desirable, it may be left within the composite pressure vessel to add support and/or insulation to the interior wall of the vessel.

A two-piece mandrel assembly 50 constructed by this prescribed method results in a reusable, seamless, inflatable/collapsible mandrel and sleeve capable of being used with any or all of the conventional composite manufacturing processes. It is also a mandrel that can collapsed to a small dimension and quickly and easily be removed from the composite article that was fabricated around it.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for constructing a mandrel assembly for use in fabricating composite articles by filament winding, braiding, tape rolling, hand lay-up, or resin transfer molding processes, said method comprising the steps of:
   (a) preparing a rigid, water soluble mandrel to a desired size and shape with a shaft extending therethrough, said shaft being mountable to a filament winding machine;
   (b) applying a first layer of elastomer to substantially cover said water soluble mandrel, said first layer of elastomer being uncured;
   (c) curing said first layer of elastomer to form a base layer for a work piece mandrel;
   (d) applying a second layer of elastomer to substantially cover said work piece mandrel, said second layer of elastomer being uncured;
   (e) winding a fiber onto said second layer of elastomer of said work piece mandrel;
   (f) applying a third layer of elastomer to cover the winding of said fiber of said work piece mandrel, said third layer of elastomer being uncured;
   (g) curing the uncured layers of elastomer of said work piece mandrel;
   (h) washing out said water soluble mandrel and removing said shaft from said work piece mandrel;

(i) machining said work piece mandrel such that a circumferential groove is formed in the surface of said work piece mandrel;

(j) constructing a cylindrical sleeve of elastomer and hoop windings of reinforcement fiber; and (k) disposing said cylindrical sleeve about said work piece mandrel such that said cylindrical sleeve is positively located within said circumferential groove.

2. A method for constructing a mandrel assembly as set forth in claim 1, wherein said water soluble mandrel is a sand mandrel comprising a water soluble bonding agent.

3. A method for constructing a mandrel assembly as set forth in claim 1, further comprising a step of applying a release ply to the exterior of said water soluble mandrel after step (a).

4. A method for constructing a mandrel assembly as set forth in claim 3, wherein the said release ply is polytetrafluoroethylene tape.

5. A method for constructing a mandrel assembly as set forth in claim 1, wherein step (b) further comprises a step of skiving and trimming edges of said first layer of elastomer so that adjacent portions of said first layer of elastomer overlap in fitted engagement.

6. A method for constructing a mandrel assembly as set forth in claim 1, wherein said first layer of elastomer comprises silicone.

7. A method for constructing a mandrel assembly as set forth in claim 1, further comprising a step of preparing the first layer of elastomer for curing after step (b).

8. A method for constructing a mandrel assembly as set forth in claim 7, wherein the step of preparing said first layer of elastomer for curing comprises steps of applying a release ply to said first layer of elastomer, applying a breather layer to said release ply, and placing a vacuum bag about said first layer of elastomer, said release ply and said breather layer.

9. A method for constructing a mandrel assembly as set forth in claim 8, wherein the step of preparing said first layer of elastomer for curing further comprises a step of drawing a vacuum to remove air and volatiles from within said vacuum bag.

10. A method for constructing a mandrel assembly as set forth in claim 1, wherein said curing of step (c) is performed in an autoclave by heating said work piece mandrel at a predetermined temperature and a predetermined pressure for a predetermined period of time.

11. A method for constructing a mandrel assembly as set forth in claim 1, wherein step (d) further comprises a step of skiving and trimming edges of said second layer of elastomer so that adjacent portions of second layer of elastomer overlap in fitted engagement.

12. A method for constructing a mandrel assembly as set forth in claim 1, wherein said fiber of step (e) comprises Kevlar.

13. A method for constructing a mandrel assembly as set forth in claim 1, further comprising a step of treating said fiber with an adhesive primer prior to step (e).

14. A method for constructing a mandrel assembly as set forth in claim 1, wherein said winding of step (e) is a helical winding.

15. A method for constructing a mandrel assembly as set forth in claim 14, wherein said winding is angle spaced so that a predetermined wind density is achieved.

16. A method for constructing a mandrel assembly as set forth in claim 1, wherein said winding of step (e) is a polar winding.

17. A method for constructing a mandrel assembly as set forth in claim 16, wherein said winding is angle spaced so that a predetermined wind density is achieved.

18. A method for constructing a mandrel assembly as set forth in claim 1, wherein step (f) further comprises a step of skiving and trimming edges of said third layer of elastomer so that adjacent portions of said third layer of elastomer overlap in fitted engagement.

19. A method for constructing a mandrel assembly as set forth in claim 1, further comprising a step of repeating steps (e) and (f) until said work piece mandrel has a predetermined thickness.

20. A method for constructing a mandrel assembly as set forth in claim 1, further comprising .the step of preparing said work piece mandrel for curing after step (f).

21. A method for constructing a mandrel assembly as set forth in claim 20, wherein the step of preparing said work piece mandrel for curing comprises steps of applying a release ply to said work piece mandrel, applying a breather layer to said release ply, and placing a vacuum bag about said work piece mandrel, said release ply and said breather layer.

22. A method for constructing a mandrel assembly as set forth in claim 21, wherein the step of preparing said work piece mandrel for curing further comprises a step of drawing a vacuum to remove air and volatiles from within said vacuum bag.

23. A method for constructing a mandrel assembly as set forth in claim 1, wherein said curing of step (g) is performed in an autoclave by heating said work piece mandrel at a predetermined temperature and a predetermined pressure for a predetermined period of time.

24. A method for constructing an inflatable/collapsible mandrel as set forth in claim 1, wherein step (h) further comprises a step of dissolving said water soluble mandrel by applying water to the interior of said work piece mandrel.

* * * * *